United States Patent Office 3,193,872
Patented July 13, 1965

3,193,872
ANTI-SHEAR AND TENSIONING DEVICE
Howard E. Freeman, Grand Prairie, Tex., assignor, by mesne assignments, to the United States of America as represented by the Secretary of the Air Force
Filed Feb. 27, 1964, Ser. No. 347,973
2 Claims. (Cl. 16—137)

This invention relates to fastening devices where a fixed object with straps on each side can be secured to a second object by passing the straps over the second object and securing them with a latch. More particularly, it relates to a device for fastening two elements together in such a manner as to eliminate relative movement or shear, between the two elements. The invention is applicable to use for attachment of a breastplate to a back plate or torso shell assembly. This type of system aids in the protection of astronauts or crew members of space vehicles and high performance aircraft.

Briefly, this invention comprises a section of piano hinge, one portion of which is riveted to one of the members to be secured and the other to a steel strap which terminates in a latch to be fastened to a similar strap originating on the opposite side of the said member in a similar manner. Part of the hinge and the strap pass through a steel channel having a steel bumper riveted therein, the channel being riveted to the second member which is to be secured to the first mentioned member. A similar steel bumper is riveted to the section of the hinge carrying the strap such that the ends of the two bumpers fit together for aiding in the prevention of shear.

When conventional clamping for joinder of the back and breast plates of the hardshell restraint system is utilized, such as straps fastened to the back plate by sewing or riveting, the plates are allowed to move up and down relative to each other unless the anti-shear arrangement of this invention is incorporated.

It is an object of this invention, therefore, to provide a strap and anti-shear device for fastening two objects together.

It is a further object to provide a device for joining two objects together which will prevent shear on the device.

It is a further object to provide such a clamping device which utilizes straps and prevents cutting or damage to the object over which the straps pass.

It is a further object to provide a clamping device which will securely hold the objects together and which can be cheaply made from readily obtainable materials that lend themselves to standard mass production manufacturing techniques.

These and other advantages will become apparent upon consideration of the following detailed description, especially when taken in conjunction with the accompanying drawings, in which.

Figure 2:
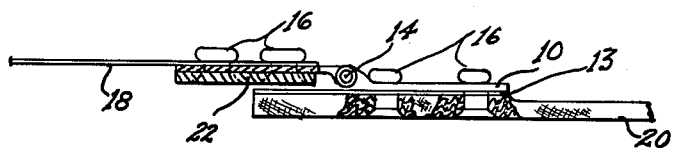
FIGURE 2 is a front elevation partly in section of FIGURE 1 and illustrating a portion of one of the members to be secured.

In the figures, a piano hinge 11 has one section 10 thereof riveted by means of rivets 16 to a back plate 20 of the type illustrated in the aforementioned hardshell restraint system. Interposed between the back plate 20 and section 10 is a shim or spacer element 13. The two sections of the hinge are pivoted on a hinge pin 14. The other section 12 of the hinge 11 is sandwiched between a steel strap 18 and a bumper plate 22 by means of rivets 16 as is best shown in FIGURE 2.

Figure 1:
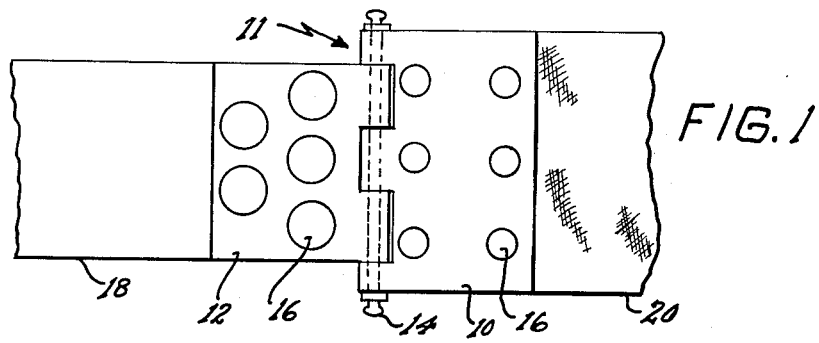
FIGURE 1 is a plan view of the hinge and strap arrangement of this invention.
Figure 5:
FIGURE 5 a section through the channel only of FIGURE 3 illustrating the channel shape and the method of securing the bumper therein.
Figure 3:
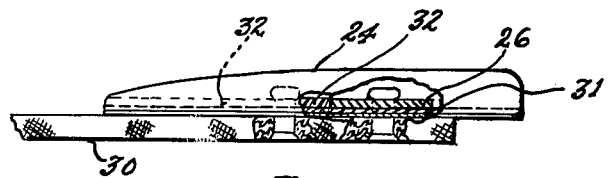
FIGURE 3 is a view partly in section illustrating a steel channel riveted to the other of the members to be secured.

A steel channel 24 (FIGURES 3 and 5) has welded therein at 28 a bumper plate 26. Holes 29 which are drilled through both the bumper plate 26 and the bottom of the channel are arranged to accommodate rivets 16 which are utilized to fasten the channel to a breastplate 30 with a shim 31 sandwiched therebetween.

Figure 4:
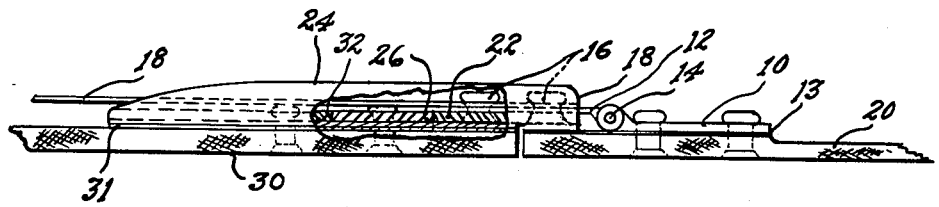
FIGURE 4 is a view partly in section showing the assembly of the hinge and the steel channel when the members are joined.

FIGURE 4 illustrates the assembly of the anti-shear device wherein hinge section 12 is placed within the channel 24 such that bumper plates 22 and 26 are in abutment. In this position, the back plate 20 and the breastplate 30 are aligned for their joinder.

Filler material 32 is provided within the channel behind the bumper plate 26 to provide support for the strap 18 and protect the breastplate from cutting by the strap. The confinement of the channel and the abutment of the bumper plates prevents relative motion between the parts which would result in a shear force. Filler material may be of any type plastic and Devcon A has been found to be suitable. With the parts in their assembled position, i.e., 30 and 20 aligned, the rivet heads may be utilized to maintain a parallel, planar relation to avoid the application of stresses in the materials. The filler material may be raised to the level of the rivet heads through element 30 and/or may be tapered to form the steel strap 18 to conform to any curvature which the plate 30 might have beyond that shown in the figures.

Assuming a similar hinge and strap arrangement on the opposite side at the seam of the breast and back plates, the straps would approach each other at the center portion of the chest of an astronaut. The two ends of the straps would be joined at this point and tensioned in order to provide a tight fit which enables support of internal pressures. Any conventional latch which would tension the ends of the straps 18, for example, a simple bolt means extending through both straps to draw the ends thereof together, could be utilized. When the unit is assembled, the contact of the bumpers provides a tight fit without crushing loads being applied to the parts to be secured.

Thus, there has been provided a unit which is utilized in the securing of two elements which prevents the application of shear forces at the points of joinder.

Although the invention has been described with reference to a particular embodiment, it will be understood to those skilled in the art that the invention is capable of a variety of alternative embodiments within the spirit and scope of the appended claims.

I claim:

1. An anti-shear and tensioning device for use where two elements are to be joined together by means of straps emanating from one of said elements, said device comprising, strap means, a hinge having one side secured to one of said elements and the other side secured to a strap means, a rigid bumper block on said other side of said hinge,
a channel member secured to the other of said elements and aligned at the mating point with said one of said elements where said hinge is secured, and
a rigid bumper block within said channel positioned to abut said first-mentioned bumper block when said strap is in position for joinder of said elements.

2. A device as defined in claim 1 wherein the sides of said channel are spaced closely to accommodate the width of said strap.

References Cited by the Examiner

UNITED STATES PATENTS 1,096,352   5/14   Burnett.
1,878,363   9/32   Bangs.
2,388,674   11/45  Browne _____ 2—2.1 X DONLEY J. STOCKING, Primary Examiner.